United States Patent
Harnetiaux

(10) Patent No.: US 9,616,950 B2
(45) Date of Patent: Apr. 11, 2017

(54) VARIABLE GEOMETRY CONTINUOUS TRACK

(71) Applicant: CNH Industrial America LLC, New Holland, PA (US)

(72) Inventor: Travis L. Harnetiaux, Bourbonnais, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/754,954

(22) Filed: Jun. 30, 2015

(65) Prior Publication Data

US 2017/0001671 A1  Jan. 5, 2017

(51) Int. Cl.
*B62D 55/30* (2006.01)
*B62D 55/084* (2006.01)
*B62D 55/06* (2006.01)
*B62D 55/14* (2006.01)
*B62D 55/10* (2006.01)

(52) U.S. Cl.
CPC .......... *B62D 55/084* (2013.01); *B62D 55/06* (2013.01); *B62D 55/10* (2013.01); *B62D 55/14* (2013.01)

(58) Field of Classification Search
CPC ....... B62D 55/084; B62D 55/06; B62D 55/14
USPC ........................ 180/9.1, 9.5, 9.52
See application file for complete search history.

(56) References Cited

U.S. PATENT DOCUMENTS

| | | | |
|---|---|---|---|
| 3,309,150 A | 3/1967 | Marier | |
| 4,483,407 A * | 11/1984 | Iwamoto | B62B 5/02 180/6.54 |
| 4,595,068 A * | 6/1986 | Seeber | B62D 55/08 180/9.28 |
| 4,896,732 A | 1/1990 | Stark | |
| 5,524,712 A | 6/1996 | Balmer | |
| 5,590,977 A | 1/1997 | Guntert et al. | |
| 5,829,370 A | 11/1998 | Bender | |
| 6,119,788 A | 9/2000 | Bernier | |
| 6,132,287 A | 10/2000 | Kuralt et al. | |
| 6,408,964 B1 * | 6/2002 | Roh | B62D 55/02 180/9.34 |
| 7,493,976 B2 * | 2/2009 | Goldenberg | B62D 55/075 180/9.1 |
| 7,708,092 B2 | 5/2010 | Després | |
| 7,866,420 B1 * | 1/2011 | Claas | B62D 55/305 180/9.1 |
| 8,333,256 B2 | 12/2012 | Stolkin et al. | |
| 8,528,657 B1 | 9/2013 | Rosenboom | |
| 8,636,326 B2 | 1/2014 | Inaoka | |
| 8,695,735 B2 | 4/2014 | Afanador | |
| 2007/0261898 A1 | 11/2007 | Bessette | |

(Continued)

OTHER PUBLICATIONS

White Planters Brochure, 8000 Series Planters, AGCO Answers, AGCO Corporation, 2011 (28 pages).

*Primary Examiner* — Tony Winner

(74) *Attorney, Agent, or Firm* — Rebecca L. Henkel; Rickard K. DeMille

(57) ABSTRACT

A continuous track assembly having forward and rearward track engaging wheels with a intermediate track engaging wheel position between them. A continuous track extends over the wheels. A foldable frame journals the wheels and is displaceable between a position where the track engaging wheels are in substantially the same plane and another position in which they are in a triangular configuration.

10 Claims, 2 Drawing Sheets

(56) References Cited

U.S. PATENT DOCUMENTS

2012/0183383 A1\* 7/2012 Stolkin ............... B62D 55/075
 414/729
2014/0035355 A1 2/2014 He et al.
2014/0083782 A1 3/2014 Brewer et al.

\* cited by examiner

VARIABLE GEOMETRY CONTINUOUS TRACK

BACKGROUND OF THE INVENTION

1. Field of the Invention

The present invention relates to continuous track assemblies, and, more specifically, to continuous track assemblies having variable geometry.

2. Description of the Related Art

A recent trend in the farm implement business has been the increasing use of continuous tracks in place of wheels for farm implements. The continuous track offers the advantage of a lower unit pressure owing to the significantly larger ground engaging area when compared to a simple wheel assembly. This is especially advantageous in multi-row planters where the added weight of the overall assembly makes it important to provide ground support that is does not allow the planter to sink into the soil.

While the continuous track assemblies provide a lower ground engaging unit pressure, they tend to be bulkier which is a problem when employed on planting implements that are articulated between a planting and transport position. The continuous track assembly can interfere with the planter frame elements as they are folded into a transport position. In addition, the continuous track assemblies, because of having a greater ground engaging area, make it harder to turn and maneuver the planter when it is in the transport position.

Accordingly, what is needed in the art is a continuous track assembly that offers low ground engaging unit area pressure yet offers easy maneuverability in a transport position.

SUMMARY OF THE INVENTION

The present invention seeks to achieve a solution to the above problems by providing variable geometry continuous track assemblies.

The present invention also solves the above problems in a simplified and cost effective way.

In one form, the invention is a continuous track assembly including a forward track engaging wheel and a rearward track engaging wheel. An intermediate track engaging wheel is positioned between the wheels and a continuous track extends around the wheels. A foldable frame journals the wheels and is displaceable between a first position in which the wheels are in substantially the same plane and a second position in which the wheels form a triangular configuration.

In another form, the invention is a farm implement having a frame and a plurality of ground support assemblies. The ground support assemblies each includes a continuous track assembly with forward and rearward track engaging wheels and an intermediate track engaging wheel positioned between the wheels. A continuous track extends around the wheels and a foldable frame journals the wheels and is displaceable between a first position in which the wheels are in substantially the same plane and a second position in which the wheels form a triangular configuration.

One advantage of the present invention is a lower ground engaging unit pressure in one configuration and another configuration offering easier maneuverability.

Another advantage is the provision of a large surface area in one configuration.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
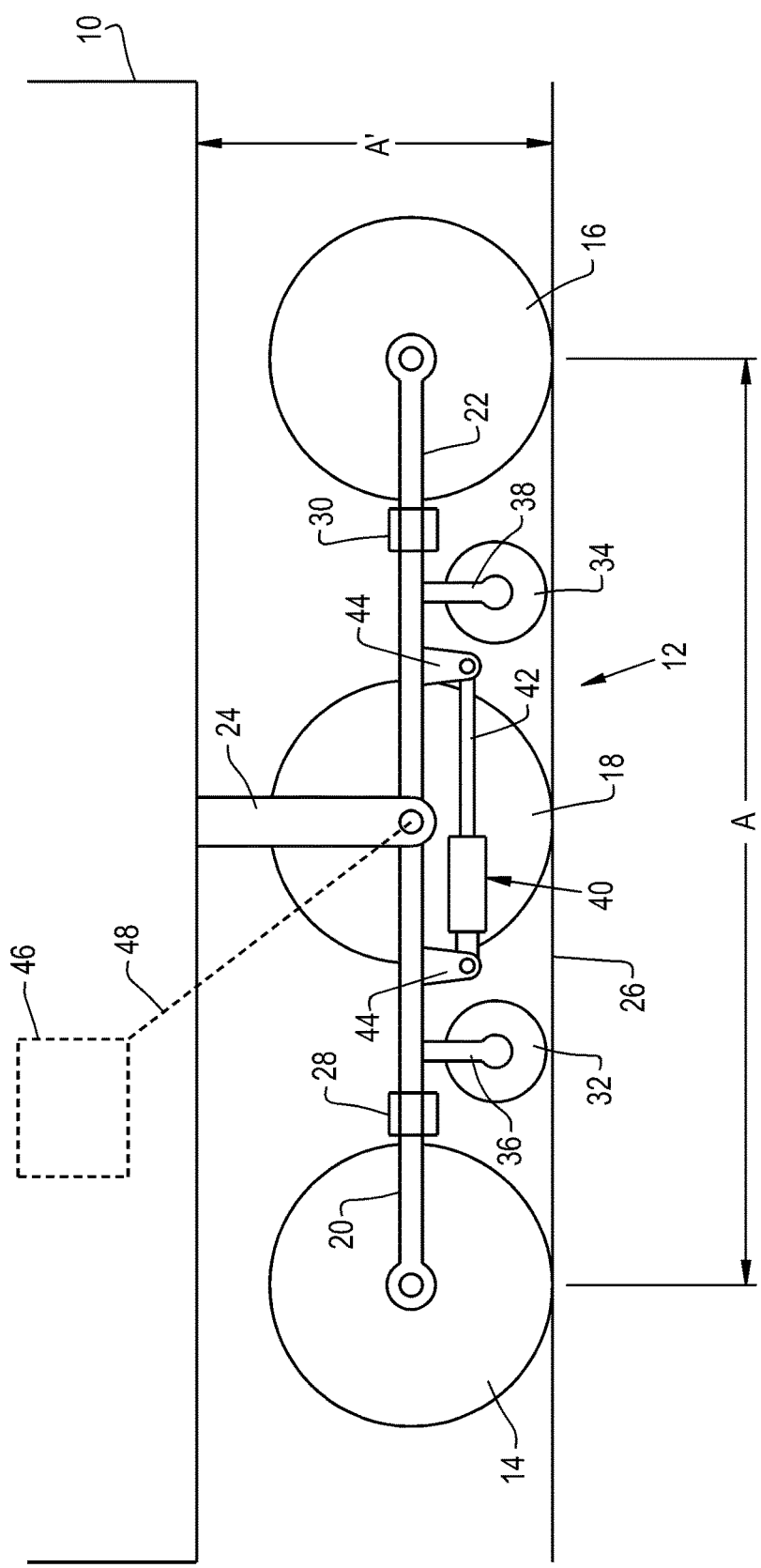
FIG. 1 is a schematic side view of a farm implement with a ground support assembly embodying the present invention shown in a first position; and, FIG. 2 is a schematic side view of the ground support assembly of FIG. 1 shown in a second position.
Figure 2:
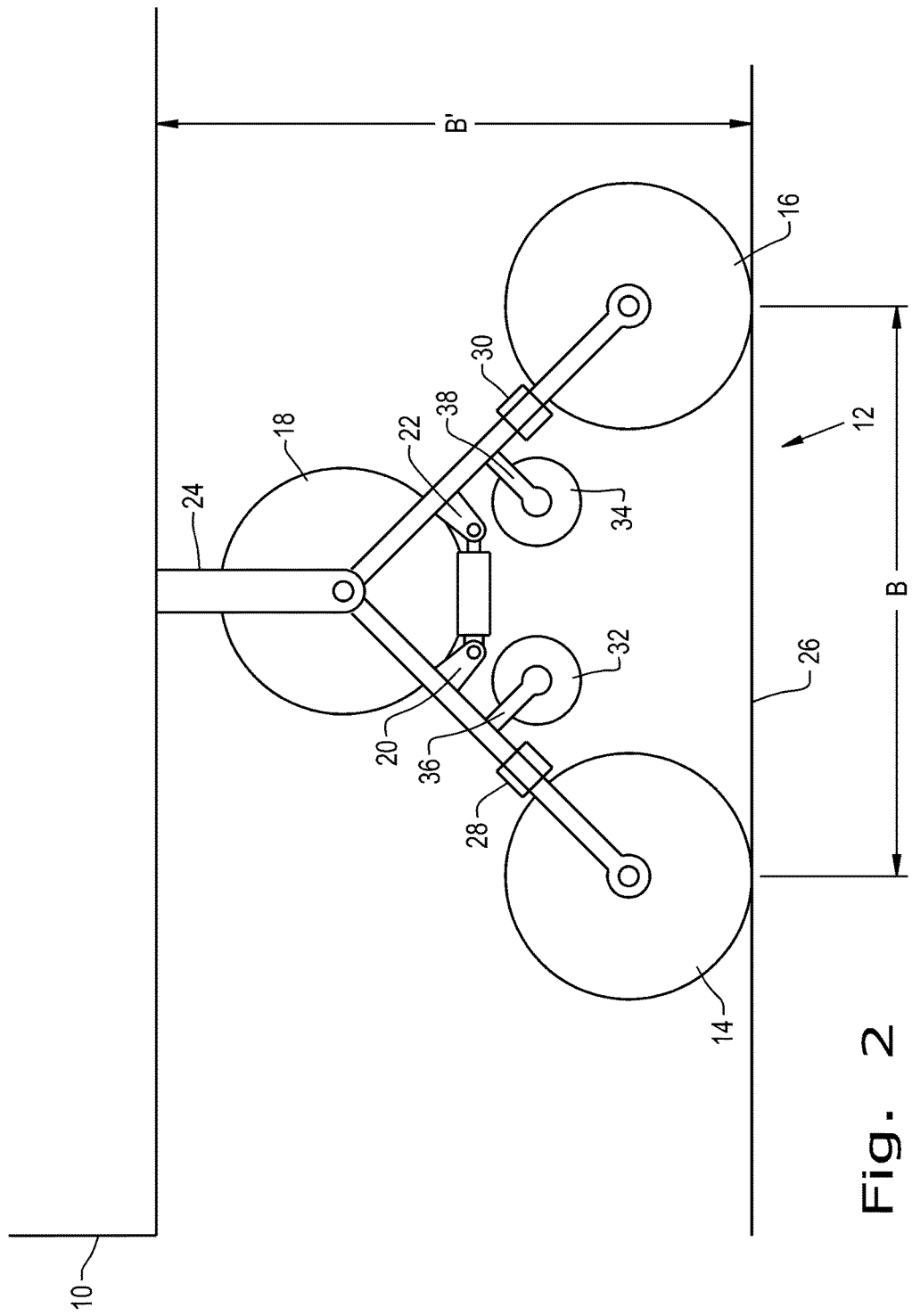

Referring to FIGS. 1 and 2, there is shown a farm implement 10 with which the present invention may be used. Farm implement 10 is shown in abbreviated schematic fashion, but is intended to encompass self-propelled farm implements such as tractors, combines and the like and towed farm implements such as tillage assemblies and planters, among other things. The implements may be self-propelled or may be towed as is the nature of their duty cycle. Farm implement 10 has a plurality of continuous track assemblies 12, only one of which is shown. Typically if the implement is self-propelled it would have a plurality of track assemblies such as 4.

Each track assembly 12 includes a forward track engaging wheel 14, a rearward track engaging wheel 16 and an intermediate track engaging wheel 18. Forward track engaging wheel 14 is supported and journaled for rotation by a frame 20 and rearward track engaging wheel 16 is supported and journaled for rotation by a frame 22. Frame members 20 and 22 are pivotally interconnected as illustrated at the rotational axis of intermediate wheel 18 so that the journaling component for wheel 18 also functions as the pivot point for frame members 20 and 22 which can be folded. A frame member 24 journals wheel 18, supports it and interconnects the track assembly 12 to the farm implement 10. Depending upon the function the interconnection 24 may be fixed or may be pivotable to provide maneuvering of the farm implement 10.

A continuous track 26 is received over wheels 14, 16 and 18 and provides contact with the soil over which the farm implement 10 moves. The exact nature of continuous track 26 is not shown, but it may be employed as a continuous toothed rubber belt or as interconnected pivotal links. A discreet number of links may be pivotally interconnected to form a continuous belt. Other forms of continuous track 26 may be employed and continue to use the benefits of the present invention.

Tension assemblies 28 and 30 connected to frames 20 and 22, respectively expand or contract to permit an appropriate level of continuous track tension for different geometries of the continuous track assembly 12. Bogie wheels 32 and 34 are supported by forward bogie frame support 36 and rearward bogie frame support 38 to be journaled and to come in contact with the continuous track 26 for support when the assembly is in the configuration shown in FIG. 1.

An actuator 40 having an extensible actuator rod 42 is pivotally connected to frames 20 and 22 through link connectors 44. Actuator 40 is shown in FIG. 1 in its extended configuration wherein the axis of wheels 14, 18 and 16 are substantially in the same plane.

As shown in FIG. 2, the actuator 40 may be actuated to retract and to move the frames 20 and 22 into a triangular configuration during which the bogie wheels are displaced out of contact with the continuous track 20. By displacing the track assemblies 12 between the configurations of FIGS. 1 and 2, the variable geometry provides optimum contact surface with the ground and at the same time provides increased maneuverability and flexibility. When the configuration is in that shown in FIG. 1, the farm implement is generally in a field position in which ground is tilled or seeds planted. In that position a maximum surface area with the ground is indicated by A is employed to result in unit pressure areas with respect to the ground that are within manageable limits. At this point, the ground clearance A1 is at a minimum. When the implement 10 is placed in a transport position, the continuous track assemblies 12 are placed in the triangular configuration of FIG. 2 so that the ground surface area shrinks from A to B while at the same time the ground clearance B' increases. By reducing the unit area the maneuverability of the farm implement is enhanced because there is less resistance to turning movements by virtue of the lower surface area. In addition, the ground clearance B' increases to increase the flexibility of movement over obstacles. Furthermore, when the continuous track assemblies 12 are utilized in a folding configuration planter, the triangular configuration of FIG. 2 experiences less interference with the articulated members of the planter assembly.

What has been described above is a towed farm implement. The implement 10 may be made in a self-propelled form by the use of a power unit 46 interconnected to one of the wheels 14, 16 and 18 to provide a driven track. As herein shown the intermediate wheel 18 is the driven wheel via a power train 48. However, any of the other wheels may be driven as appropriate. It is to be noted that one or more of the continuous track assemblies 12 in the farm implement 10 may be driven to as needed for the particular function.

When the continuous track assemblies 12 are in their in the position shown in FIG. 1, the bogie wheels 32 and 34 provide additional support between the various track engaging wheels. However, when the continuous track assembly 12 is pivoted to the position of FIG. 2, they are taken out of contact with the continuous track 26. The tensioners 28 and 30 properly accommodate variations in length caused by the variable wrapping of continuous track 26 around the track engaging drive wheels.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A continuous track assembly comprising;
   a forward track engaging wheel;
   a rearward track engaging wheel;
   an intermediate track engaging wheel positioned between said forward and rearward wheels;
   a continuous track extending around said wheels;
   a foldable frame journaling said wheels and displaceable between a first position wherein said wheels are substantially on a same plane and a second position wherein the wheels form a triangular configuration; and
   an actuator interconnecting between said foldable frame for displacing said foldable frame between the first and second positions,
   wherein said foldable frame is pivotal about said intermediate wheel, and
   wherein said intermediate track engaging wheel is in line with a structural connection for said continuous track assembly.

2. The continuous track assembly of claim 1 wherein said foldable frame is pivoted about an axis of said intermediate track engaging wheel.

3. The continuous track assembly of claim 1 wherein said foldable frame includes tension assemblies for selectively expanding and contracting said foldable frames to maintain tension in said continuous track.

4. The continuous track assembly of claim 1 further comprising bogie wheels mounted on said foldable frame and positioned to engage said continuous track when said wheels are substantially on a same plane and displaced away from said track when said wheels are in the triangular configuration.

5. A farm implement comprising;
   a frame; and,
   a plurality of continuous track assemblies for providing ground support to said frame, said continuous track assemblies as comprising:
   a forward track engaging wheel;
   a rearward track engaging wheel;
   an intermediate track engaging wheel;
   a continuous track extending around said wheel;
   a foldable frame journaling said wheels and displaceable between a first position
   wherein said wheels are substantially on a same plane and a second position wherein the wheels form a triangular configuration; and
   an actuator interconnecting said foldable frame and operable to displace said foldable frame between said first and second positions,
   wherein said foldable frame includes tension assemblies for selectively expanding and contracting said foldable frame to maintain tension in said continuous track,
   wherein the foldable frame is pivoted about the intermediate track engaging wheel, and
   wherein said continuous track assemblies are connected to said frame through said intermediate wheel.

6. The farm implement as claimed in claim 5 wherein said foldable frame is pivoted about an axis of said intermediate track engaging wheel.

7. The farm implement as claimed in claim 5 further comprising bogie wheels mounted on said frame and positioned to engage said continuous track when said wheels are substantially in the same plane and displaced away from said track when said wheels are in the triangular configuration.

8. The farm implement of claim 5 further comprising:
   a power unit mounted on said frame; and,
   a power train connecting said power unit to at least one of said endless track assemblies.

9. The farm implement of claim 8 wherein said power train connects said power unit to said intermediate track engaging wheel.

10. A continuous track assembly comprising:
    a forward track engaging wheel;
    a rearward track engaging wheel;
    an intermediate track engaging wheel positioned between said forward and rearward wheels;
    a continuous track extending around said wheels;

a foldable frame journaling said wheels and displaceable between a first position wherein said wheels are substantially on a same plane and a second position wherein the wheels form a triangular configuration; and an actuator interconnecting between said foldable frame for displacing said foldable frame between the first and second positions.

\* \* \* \* \*